(12) United States Patent
Park

(10) Patent No.: US 12,512,161 B2
(45) Date of Patent: Dec. 30, 2025

(54) NAND FLASH MEMORY DEVICE WITH ENHANCED DATA RETENTION CHARACTERISTICS AND OPERATING METHOD THEREOF

(71) Applicants: SK hynix Inc., Icheon (KR); Seoul National University R&DB Foundation, Seoul (KR)

(72) Inventor: Sung Ho Park, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 251 days.

(21) Appl. No.: 18/340,473

(22) Filed: Jun. 23, 2023

(65) Prior Publication Data
US 2024/0265975 A1  Aug. 8, 2024

(30) Foreign Application Priority Data

Feb. 3, 2023  (KR) .................. 10-2023-0014805

(51) Int. Cl.
G11C 16/14 (2006.01)
G11C 16/04 (2006.01)
G11C 16/08 (2006.01)
G11C 16/24 (2006.01)

(52) U.S. Cl.
CPC .......... G11C 16/14 (2013.01); G11C 16/0483 (2013.01); G11C 16/08 (2013.01); G11C 16/24 (2013.01)

(58) Field of Classification Search
CPC .. G11C 16/34; G11C 16/3404; G11C 16/3413
See application file for complete search history.

(56) References Cited

U.S. PATENT DOCUMENTS 7,907,450 B2   3/2011  Lue et al.
9,324,439 B1   4/2016  Chen et al.
(Continued)

OTHER PUBLICATIONS

Hang-Ting Lue et al. "Study of Charge Loss Mechanism of SONOS-Type Devices using Hot-Hole Erase and Methods to Improve the Charge Retention," 2006 IEEE International Reliability Physics Symposium Proceedings, Mar. 26-30, 2006, pp. 523-529, San Jose, CA, USA, doi: 10.1109/RELPHY.2006.251273.
(Continued)

Primary Examiner — Alfredo Bermudez Lozada

(57) ABSTRACT

A flash memory device includes a control circuit and a cell array including a first memory string including a plurality of first flash memory cells having control gates connected to a plurality of word lines, respectively, and a first bit line selection switch connecting the plurality of first flash memory cells to a first bit line in response to a voltage of a first drain selection line. The control circuit controls a first operation to program a selected flash memory cell with data so that a threshold voltage of the selected flash memory cell becomes greater than a first target threshold voltage and a second operation to erase the selected flash memory cell so that the threshold voltage becomes equal to or smaller than a target threshold voltage, the first target threshold voltage being greater than the target threshold voltage that is set according to the data.

19 Claims, 16 Drawing Sheets

(56) References Cited

U.S. PATENT DOCUMENTS 9,711,229 B1     7/2017    Rabkin et al.
2015/0364185 A1*   12/2015    Yoo .................... G11C 11/5635
                                                                 365/185.03

OTHER PUBLICATIONS

Sung-Tae Lee et al. "High-Density and Highly-Reliable Binary Neural Networks Using NAND Flash Memory Cells as Synaptic Devices," 2019 IEEE International Electron Devices Meeting (IEDM), Dec. 7-11, 2019, p. 38.4.1-38.4.4, San Francisco, CA, USA, doi: 10.1109/IEDM19573.2019.8993478.

Ho-Nam Yoo et al. "First Demonstration of 1-bit Erase in Vertical NAND Flash Memory," 2022 IEEE Symposium on VLSI Technology and Circuits (VLSI Technology and Circuits), Jun. 12-17, 2022, pp. 304-305, Honolulu, Hi, USA, doi: 10.1109/VLSITechnologyandCir46769.2022.9830445.

K. Simonyan et al. "Very deep convolutional networks for large-scale image recognition," preprint arXiv:1409.1556.; Apr. 10, 2015, pp. 1-14; https://arxiv.org/abs/1409.1556v6.

G. Ghibaudo et al. "Improved analysis of low frequency noise in field-effect MOS transistors," Phys. Stat. Sol.(a), Apr. 16, 1991, pp. 571-581, vol. 124.

Y. Komori et al., "Disturbless flash memory due to high boost efficiency on BiCS structure and optimal memory film stack for ultra high density storage device," 2008 IEEE International Electron Devices Meeting, Dec. 15-17, 2008, pp. 1-4, San Francisco, CA, USA, doi: 10.1109/IEDM.2008.4796831.

Ho-Nam Yoo et al. "Effect of Lateral Charge Diffusion on Retention Characteristics of 3D NAND Flash Cells," in IEEE Electron Device Letters, Aug. 2021, pp. 1148-1151, vol. 42, No. 8, doi: 10.1109/LED.2021.3088851.

Min-Kyu Jeong et al. "Analysis of Random Telegraph Noise and low frequency noise properties in 3-d stacked NAND flash memory with tube-type poly-Si channel structure," 2012 Symposium on VLSI Technology (VLSIT), Jun. 12-14, 2012, pp. 55-56, Honolulu, HI, USA, doi: 10.1109/VLSIT.2012.6242458.

Chul-Heung Kim et al. "Emerging memory technologies for neuromorphic computing," Nanotechnology, Jan. 2019, pp. 1-33, vol. 30, No. 3, Art. No. 032001, doi: 10.1088/1361-6528/aae975.

Sung-Tae Lee et al. "Neuromorphic computing using NAND flash memory architecture with pulse width modulation scheme," Frontiers Neuroscience, Sep. 18, 2020, pp. 1-10, vol. 14, doi: 10.3389/fnins.2020.571292.

A. Grossi et al. "Quality-of-Service Implications of Enhanced Program Algorithms for Charge-Trapping NAND in Future Solid-State Drives," in IEEE Transactions on Device and Materials Reliability, Sep. 2015, pp. 363-369, vol. 15, No. 3, doi: 10.1109/TDMR.2015.2448108.

N. Shibata et al. "13.1 A 1.33Tb 4-bit/Cell 3D-Flash Memory on a 96-Word-Line-Layer Technology," 2019 IEEE International Solid-State Circuits Conference—(ISSCC), Feb. 17-21, 2019, pp. 210-212, San Francisco, CA, USA, doi: 10.1109/ISSCC.2019.8662443.

Chih-Ping Chen et al. "Study of fast initial charge loss and it's impact on the programmed states Vt distribution of charge-trapping NAND Flash," 2010 International Electron Devices Meeting, Dec. 6-8, 2010, pp. 5.6.1-5.6.4, San Francisco, CA, USA, doi: 10.1109/IEDM.2010.5703304.

S. J. Baik et al. "Charge diffusion in silicon nitrides: Scalability assessment of nitride based flash memory," 2011 International Reliability Physics Symposium, Apr. 10-14, 2011, pp. 6B.4.1-6B.4.6, Monterey, CA, USA, doi: 10.1109/IRPS.2011.5784550.

Sung-Tae Lee et al., "Novel Method Enabling Forward and Backward Propagations in NAND Flash Memory for On-Chip Learning," in IEEE Transactions on Electron Devices, Jul. 2021, pp. 3365-3370, vol. 68, No. 7, doi: 10.1109/TED.2021.3081610.

Kang-Deog Suh et al. "A 3.3 V 32 Mb NAND flash memory with incremental step pulse programming scheme," in IEEE Journal of Solid-State Circuits, Nov. 1995, pp. 1149-1156, vol. 30, No. 11, doi: 10.1109/4.475701.

B.Choi et al. "Comprehensive evaluation of early retention (fast charge loss within a few seconds) characteristics in tube-type 3-D Nand flash memory," 2016 IEEE Symposium on VLSI Technology, Jun. 14-16, 2016, pp. 1-2, Honolulu, HI, USA, doi: 10.1109/VLSIT.2016.7573385.

Jin-Kyu Kang et al. "Highly Reliable Cell Characteristics with CSOB(Channel-hole Sidewall ONO Butting) Scheme for 7th Generation 3D-NAND," 2021 IEEE International Electron Devices Meeting (IEDM), Dec. 11-16, 2021, pp. 10.1.1-10.1.4, San Francisco, CA, USA, doi: 10.1109/IEDM19574.2021.9720643.

Sung-Tae Lee et al. "NAND Flash Based Novel Synaptic Architecture for Highly Robust and High-Density Quantized Neural Networks With Binary Neuron Activation of (1, 0)," in IEEE Access, Jul. 1, 2020, pp. 114330-114339, vol. 8, doi: 10.1109/ACCESS.2020.3004045.

* cited by examiner

FIG. 4

| BL | DSL | $V_{BL}$ | $V_{DSL}$ | $V_{GIDL}$ ($V_{BL}$ - $V_{DSL}$) |
|---|---|---|---|---|
| Selected | Selected | 16 V | 10 V | 6 V (GIDL Erase) |
| Selected | Unselected | 16 V | 13 V | 3 V (No GIDL) |
| Unselected | Selected | 12 V | 10 V | 2 V (No GIDL) |
| Unselected | Unselected | 12 V | 13 V | -1 V (No GIDL) |

<Prior Art>

NAND FLASH MEMORY DEVICE WITH ENHANCED DATA RETENTION CHARACTERISTICS AND OPERATING METHOD THEREOF

CROSS-REFERENCE TO RELATED APPLICATION

The present application is related to and claims priority under 35 U.S.C. § 119(a) to Korean Patent Application No. 10-2023-0014805, filed on Feb. 3, 2023, which is incorporated herein by reference in its entirety.

BACKGROUND

1. Technical Field

Various embodiments generally relate to a NAND flash memory device capable of erasing data stored in a selected flash memory cell among a plurality of flash memory cells included in a NAND string and having improved data retention characteristics, and an operation method thereof.

2. Related Art

In a conventional NAND flash memory device using a floating gate or a silicon/oxide/nitride/oxide/silicon (SONOS) structure, writing and erasing for a single flash memory cell are freely performed.

However, in a NAND flash memory device including a NAND string, a write operation can be performed for a single flash memory cell in the NAND string, but an erase operation for a single flash memory cell in the NAND string cannot be performed and the erase operation should be performed by units of blocks.

That is, in the conventional NAND flash memory device, a write-protection condition for another flash memory cell exists during the write operation, but an erase-protection condition for another flash memory cell does not exist during the erase operation.

Such a problem exists not only in a NAND flash memory device having a two-dimensional structure but also in a NAND flash memory device having a three-dimensional structure.

In a conventional three-dimensional NAND flash memory device, an erase operation using gate induced drain leakage (GIDL) may be performed.

However, in the conventional NAND flash memory device, a condition for preventing other flash memory cells from being erased while performing an erase operation on a selected flash memory cell has not been developed.

When a write operation is performed for a single flash memory cell and an erase operation is performed for a block, data failure may occur in a specific flash memory cell when a threshold voltage characteristic of the specific flash memory cell is different from those of the other flash memory cells in the block.

In order to solve this problem, an error correction technique can be adopted, which requires a lot of hardware and software resources.

Since it is impossible to perform an erase operation on a specific flash memory cell only in which an error has occurred, the erase operation should be performed on a block including the specific flash memory cell. As a result, the number of write operations and the number of erase operations performed on flash memory cells increase, and thus characteristics of the flash memory cells may be deteriorated easily.

This problem may occur more frequently as the number of data levels stored in one flash memory cell increases. Thus, this becomes a severe problem when the accuracy of data stored in each flash memory cell is important, e.g., in a neural network arithmetic circuit that stores weights using a NAND flash memory device.

In a process of programming a flash memory cell, electrons stored in a charge trap layer (CTL) of the flash memory cell escape over time, so that a threshold voltage of the flash memory cell is changed, resulting in weakening data stability of the flash memory cell.

In a conventional two-dimensional NAND flash memory device, a technique of improving data retention characteristics by applying a negative voltage to word lines and performing an erase operation on all flash memory cells connected to all word lines in a batch has been used.

However, when a batch erase operation is performed as in the prior art, data stored in memory cells may change when the data stored in the memory cells are different from each other.

In addition, in a three dimensional NAND flash memory device, it is difficult to use the conventional method applying a negative voltage to a word line in order to prevent a negative bias from being applied between a cell and a peripheral circuit.

SUMMARY

In accordance with an embodiment of the present disclosure, a flash memory device may include a cell array including a first memory string that includes a plurality of first flash memory cells and a first bit line selection switch, the plurality of first flash memory cells having control gates connected to a plurality of word lines, respectively, and the first bit line selection switch connecting the plurality of first flash memory cells to a first bit line in response to a voltage of a first drain selection line; and a control circuit configured to control a write operation for writing data into a selected flash memory cell among the plurality of first flash memory cells in the first memory string, wherein the control circuit controls a first operation to program the selected flash memory cell with the data so that a threshold voltage of the selected flash memory cell becomes greater than a first target threshold voltage and a second operation to erase the selected flash memory cell so that the threshold voltage becomes equal to or smaller than a target threshold voltage, the first target threshold voltage being greater than the target threshold voltage that is set according to the data.

In accordance with an embodiment of the present disclosure, an operation method of a flash memory device including a cell array including a first memory string having a plurality of first flash memory cells and a first bit line selection switch, the plurality of first flash memory cells having control gates connected to a plurality of word lines, respectively, and the first bit line selection switch connecting the plurality of first flash memory cells to a first bit line in response to a voltage of a first drain selection line, the operation method may include performing a first operation for programming a selected flash memory cell among the plurality of first flash memory cells so that a threshold voltage of the selected flash memory cell becomes a first threshold voltage that is greater than a target threshold voltage set according to data to be programmed in the selected flash memory cell; and performing a second operation for erasing the selected flash memory cell so that the threshold voltage of the selected flash memory cell becomes equal to or smaller than the target threshold voltage.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

FIG. 4 is a table showing an erase condition of a flash memory cell of a flash memory device according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
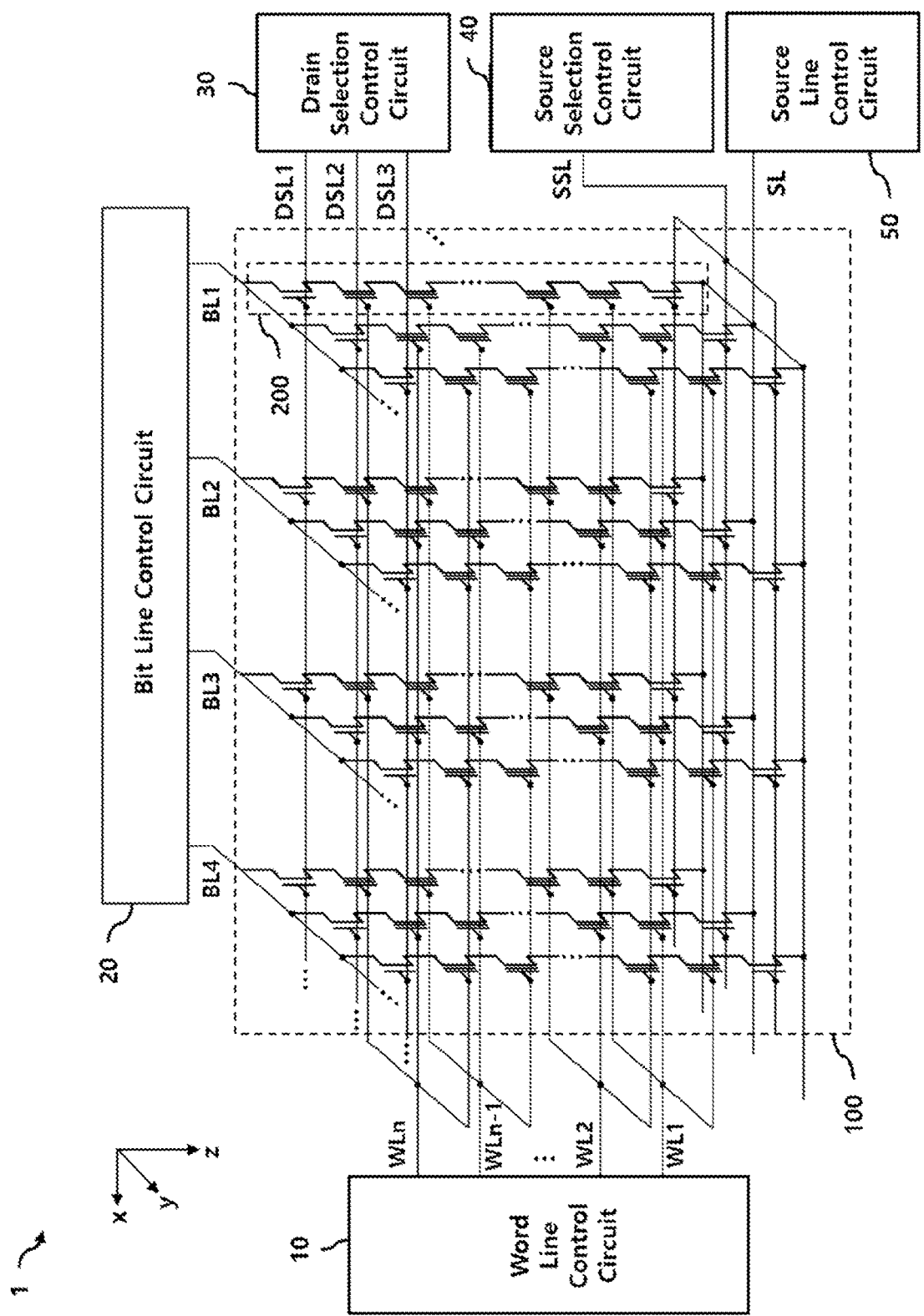
FIG. 1 illustrates a flash memory device according to an embodiment of the present disclosure.

FIG. 1 illustrates a flash memory device 1 according to an embodiment of the present disclosure.

The flash memory device 1 includes a cell array 100 including a plurality of NAND strings 200, a word line control circuit 10 for controlling word lines, e.g., WL1 to WLn, of the cell array 100, a bit line control circuit 20 for controlling bit lines, e.g., BL1 to BL4, of the cell array 100, a drain selection control circuit 30 for controlling drain selection lines, e.g., DSL1 to DSL3, of the cell array 100, a source selection control circuit 40 for controlling a source selection line SSL of the cell array 100, and a source line control circuit 50 for controlling a source line SL of the cell array 100.

The word line control circuit 10, the bit line control circuit 20, the drain selection control circuit 30, the source selection control circuit 40, and the source line control circuit 50 may be collectively referred to as a control circuit.

That is, in the present embodiment, the control circuit performs a cell erase operation on a single flash memory cell by controlling the word lines WL1 to WLn, the bit lines BL1 to BL4, the drain selection lines DSL1 to DSL3, the source selection line SSL, and the source line SL. The drain selection line may be also referred to as a "string selection line."

Figure 2:
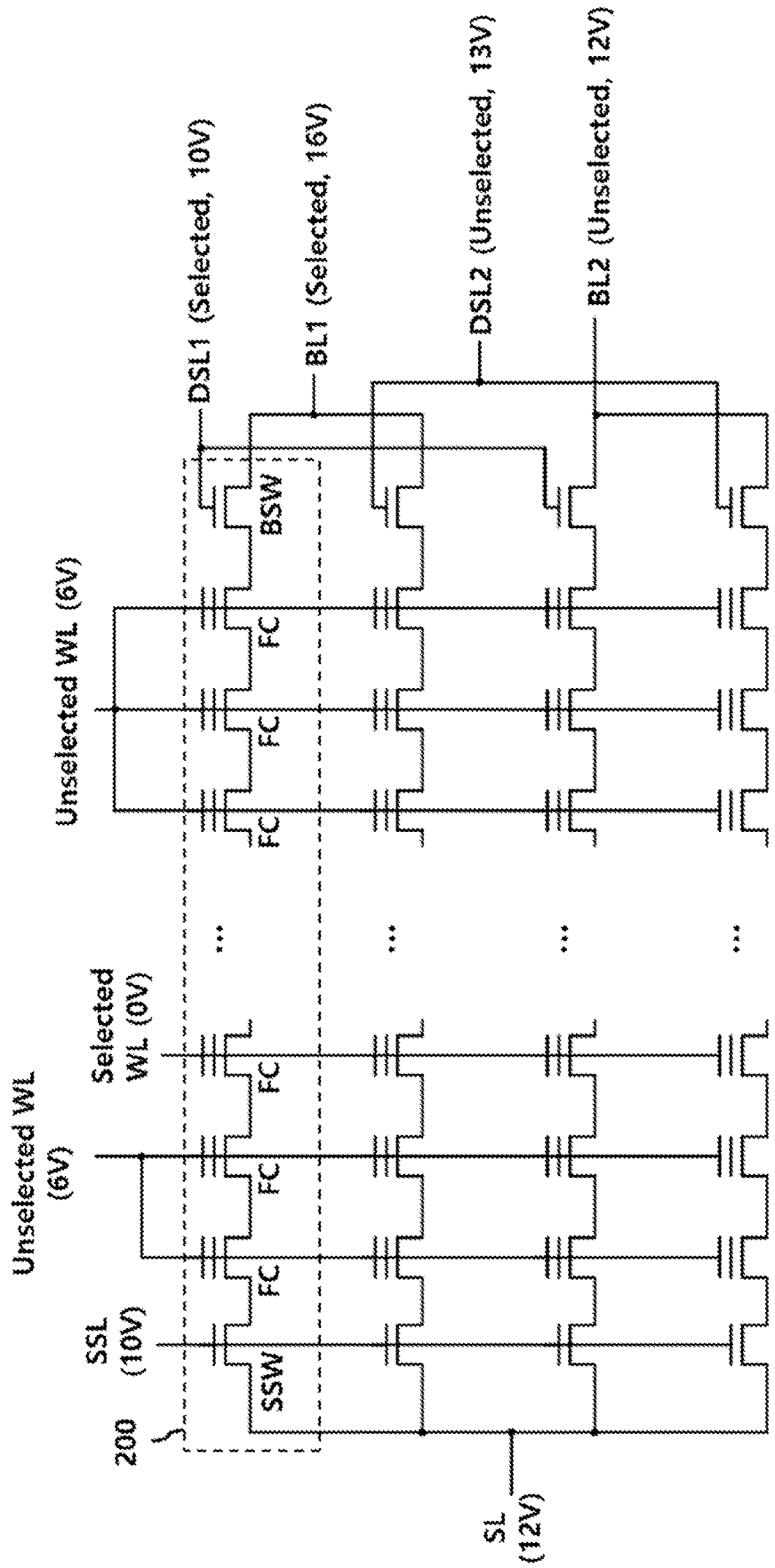
FIGS. 2 and 3 illustrate an erase condition of a flash memory cell of a flash memory device according to an embodiment of the present disclosure.

FIG. 2 illustrates four NAND strings connected to two adjacent bit lines and two drain selection lines of FIG. 1.

Referring to FIG. 2, a NAND string 200 is a structure generally used in a NAND flash memory device. The NAND string 200 includes a bit line selection switch BSW, a plurality of flash memory cells FC, and a source line selection switch SSW that are sequentially connected between a bit line BL and a source line SL.

In this embodiment, the bit line selection switch BSW and the source line selection switch SSW are NMOS transistors.

A drain selection line DSL is connected to a gate of the bit line selection switch BSW, a plurality of word lines WL are respectively connected to control gates of the plurality of flash memory cells FC, and a source selection line SSL is connected to a gate of the source line selection switch SSW.

Since the bit line selection switch BSW and the source line selection switch SSW perform a function of selecting the NAND string 200, they may be referred to as string selection switches.

In the present embodiment, since the bit line selection switch BSW and the source line selection switch SSW are NMOS transistors, a region connected to the bit line BL and a region connected to the source line SL are doped with N-type impurities.

On the other hand, when the bit line selection switch BSW and the source line selection switch SSW are PMOS transistors, voltages applied to the bit line BL, the source line SL, the drain selection line DSL, and the source selection line SSL may be changed. This can be easily understood by a person skilled in the art from the disclosure of the present invention, and thus the specific disclosure thereof is omitted.

Returning to FIG. 1, in the cell array 100, the plurality of NAND strings 200 are arranged in two dimensions, e.g., on an x-y plane defined by an x-axis and an y-axis, and each of the plurality of NAND strings 200 includes a plurality of flash memory cells FC sequentially connected to each other, e.g., on a z-axis. Therefore, a plurality of flash memory cells in the cell array 100 is arranged in three dimensions.

One word line is commonly connected to control gates of a plurality of flash memory cells, and the plurality of flash memory cells are positioned on a plane, e.g., the x-y plane, perpendicular to the z-axis.

One bit line BL is commonly connected to drains of a plurality of bit line selection switches BSW, and the plurality of bit line selection switches BSW are positioned on a plane, e.g., a y-z plane, perpendicular to the x-axis.

One drain selection line DSL is commonly connected to gates of a plurality of bit line selection switches BSW, and the plurality of bit line selection switches BSW are positioned on a plane, e.g., a x-z plane, perpendicular to the y-axis.

The source line SL is commonly connected to sources of source line selection switches of all the plurality of NAND strings 200.

The source selection line SSL is commonly connected to gates of the source line selection switches of all the plurality of NAND strings 200.

The cell array 100 has substantially the same configuration as the conventional cell array.

The present disclosure provides a technique for selecting and erasing one flash memory cell without changing the configuration of the cell array 100.

In this embodiment, the word line control circuit 10 provides different voltage signals to a word line to which a selected flash memory cell FC is connected and a word line to which an unselected flash memory cell FC is connected.

In this embodiment, the bit line control circuit 20, the drain selection control circuit 30, the source selection control circuit 40, and the source line control circuit 50 respectively set voltages provided to a bit line BL, a drain selection line DSL, the source selection line SSL, and the source line SL according to a predetermined condition, and generate gate induced drain leakage (GIDL) in a selected NAND string 200 in which the selected flash memory cell FC is located.

Holes generated by the GIDL are supplied to a channel of the selected NAND string 200 to move electrons stored in a charge storage layer of the selected flash memory cell FC to the channel, or holes are stored in the charge storage layer to lower a threshold voltage of the selected flash memory cell FC, so that an erase operation is performed on the selected flash memory cell FC.

FIG. 2 illustrates an erase operation for one flash memory cell in the flash memory device 1 of FIG. 1 according to an embodiment of the present disclosure, and FIG. 4 is a table showing voltages provided to a bit line BL and a drain selection line DSL in the erase operation.

In this embodiment, 6V is applied to a word line connected to an unselected flash memory cell FC, and 0V is applied to a word line connected to a selected flash memory cell FC. Hereinafter, the word line connected to the selected flash memory cell FC is referred to as a selected word line, and the word line connected to the unselected flash memory cell FC is referred to as an unselected word line.

In this embodiment, 16V is applied to a bit line BL1 connected to a selected NAND string including the selected flash memory cell FC, and 12V is applied to a bit line BL2 connected to an unselected NAND string. Hereinafter, the bit line connected to the selected flash memory cell FC is referred to as a selected bit line, and the bit line BL2 connected to the unselected NAND string is referred to as an unselected bit line.

10V is applied to a drain selection line DSL1 connected to a bit line selection switch BSW to which the selected flash memory cell FC is connected, and 13V is applied to a drain selection line DSL2 connected to a bit line selection switch BSW of the unselected NAND string.

Hereinafter, the drain selection line DSL1 connected to the selected flash memory cell FC is referred to as a selected drain selection line, and the drain selection line DSL2 connected to the unselected NAND string is referred to as an unselected drain selection line.

In FIG. 2, the erase operation is performed only on one selected flash memory cell FC that is connected to the selected word line WL, the selected bit line BL1, and the selected drain selection line DSL1. The erase operation is not performed on unselected flash memory cells in the selected NAND string and on flash memory cells in the unselected NAND string.

A voltage obtained by subtracting a voltage $V_{DSL}$ of the drain selection line DSL from a voltage $V_{BL}$ of the bit line BL or a voltage obtained by subtracting a voltage $V_{SSL}$ of the source selection line SSL from a voltage $V_{SL}$ of the source line SL may be expressed as a GIDL voltage $V_{GIDL}$.

The GIDL voltage $V_{GIDL}$ has one of four combinations shown in FIG. 4 depending on whether a bit line BL and a drain selection line DSL are selected or not.

In this embodiment, the GIDL voltage $V_{GIDL}$ between the selected bit line BL1 and the selected drain selection line DSL1 satisfies an erase condition by GIDL. If the GIDL voltage $V_{GIDL}$ does not satisfy the erase condition by the GIDL, the erase operation by the GIDL is suppressed, i.e., the erase operation is not performed.

In the present embodiment, when the GIDL voltage $V_{GIDL}$ is 6V or more, the erase condition by the GIDL is satisfied. On the other hand, when the GIDL voltage $V_{GIDL}$ is less than 6V, the erase operation is suppressed.

In the present embodiment, 0V is applied to the selected word line connected to the selected flash memory cell FC, and 6V is applied to the unselected word line connected to the unselected flash memory cell FC. Therefore, holes move to a charge storage layer of the selected flash memory cell FC or electrons move from the charge storage layer to a channel, so that a threshold voltage of the selected flash memory cell FC is reduced.

When a lower voltage, for example, a negative voltage, is provided to the selected word line, holes can migrate to the charge storage layer in a shorter time.

In the present embodiment, since 12V is applied to the source line SL and 10V is applied to the source selection line SSL, the GIDL voltage $V_{GIDL}$ at a source line side becomes 2V. Accordingly, the GIDL does not occur at the source line side and the GIDL occurs only at a bit line side.

Power consumption may be reduced by reducing a current flowing between the bit line BL and the source line SL in the erase operation for only the selected flash memory cell FC.

When the voltage $V_{SSL}$ applied to the source selection line SSL is 10V and the voltage $V_{SL}$ applied to the source line SL is 12V, the source line selection switch SSW is turned off, so that the current flowing between the bit line BL and the source line SL is cut off.

When erasing one selected flash memory cell as in the present embodiment, it may be advantageous to cut off the generation of the GIDL at the source line side to reduce the power consumption.

Even though the erase operation for one selected flash memory cell is performed, a block erase operation may be required.

In order to perform the block erase operation, the voltage $V_{SL}$ of the source line SL may be increased to 16V and voltages of all word lines may be set to 0V.

Since the source line SL is commonly connected to all the NAND strings 200, the block erase operation may be performed with less complexity compared to adjusting voltages of all bit lines and voltages of all string selection lines.

The bit line voltage $V_{BL}$ or the source line voltage $V_{SL}$ may be referred to as an erase voltage $V_{erase}$ or an erase bias.

The erase voltage $V_{erase}$ may affect the erase operation together with the GIDL voltage $V_{GIDL}$. For example, when the GIDL voltage $V_{GIDL}$ is fixed, the erase performance may be improved as the erase voltage $V_{erase}$ increases.

Figure 3:
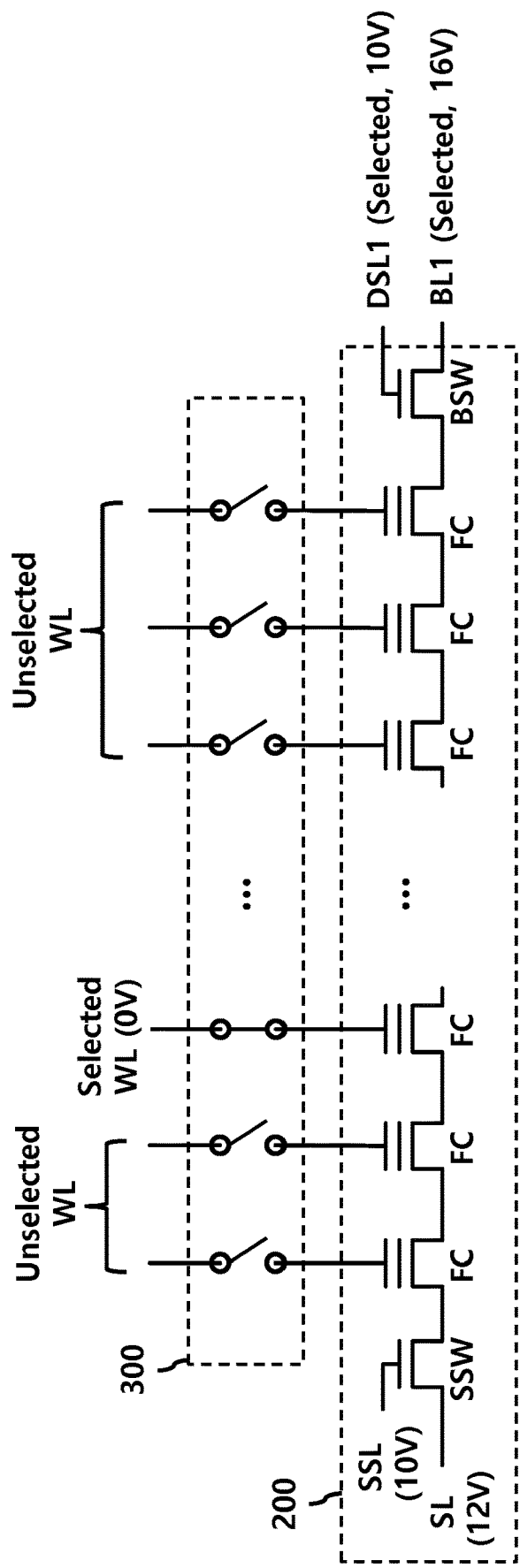

FIG. 3 illustrates a cell erase operation for a selected flash memory cell of the flash memory device 1 of FIG. 1.

In the embodiment of FIG. 3, the memory cell array 100 of FIG. 1 further includes a plurality of switches 300, and the plurality of switches 300 connect a plurality of word lines to control gates of a plurality of flash memory cells, respectively.

The word line control circuit 10 may additionally control the plurality of switches 300 to perform the cell erase operation.

The word line control circuit 10 controls the plurality of switches 300 so that the selected flash memory cell is connected to a corresponding word line of the plurality of word lines and unselected flash memory cells are separated from corresponding word lines of the plurality of word lines.

In the present embodiment, a low voltage, for example, 0V, is applied to a control gate of the selected flash memory cell, so that holes move into a charge storage layer of the selected flash memory cell.

On the other hand, a control gate of an unselected flash memory cell on which the cell erase operation is not to be performed is not connected to a corresponding word line.

In this case, a positive body voltage may be applied to the control gate of the unselected flash memory cell, so that the control gate of the unselected flash memory cell may have a voltage greater than 0V.

In an embodiment, before the cell erase operation starts, a positive voltage is applied to a word line connected to an unselected flash memory cell in advance so that a switch connected to the unselected flash memory cell is turned on. After that, when the cell erase operation starts, the switch connected to the unselected flash memory cell is turned off. Therefore, it is possible to prevent the cell erase operation from being performed on the unselected flash memory cell.

In another embodiment, a word line voltage 0V of the selected flash memory cell may affect a voltage at a control gate of an unselected flash memory cell adjacent to the selected flash memory cell. Therefore, to prevent this, a positive voltage, e.g., 6V, may be applied as shown in FIG. 2 to control gates of one or more unselected flash memory cells adjacent to the selected flash memory cell, and control gates of the remaining unselected flash memory cells may be set to be in a floating state as shown in FIG. 3.

In this case, the number of adjacent unselected flash memory cells to which the positive voltage is applied may be appropriately changed by a person skilled in the art according to an embodiment.

Figure 5A:
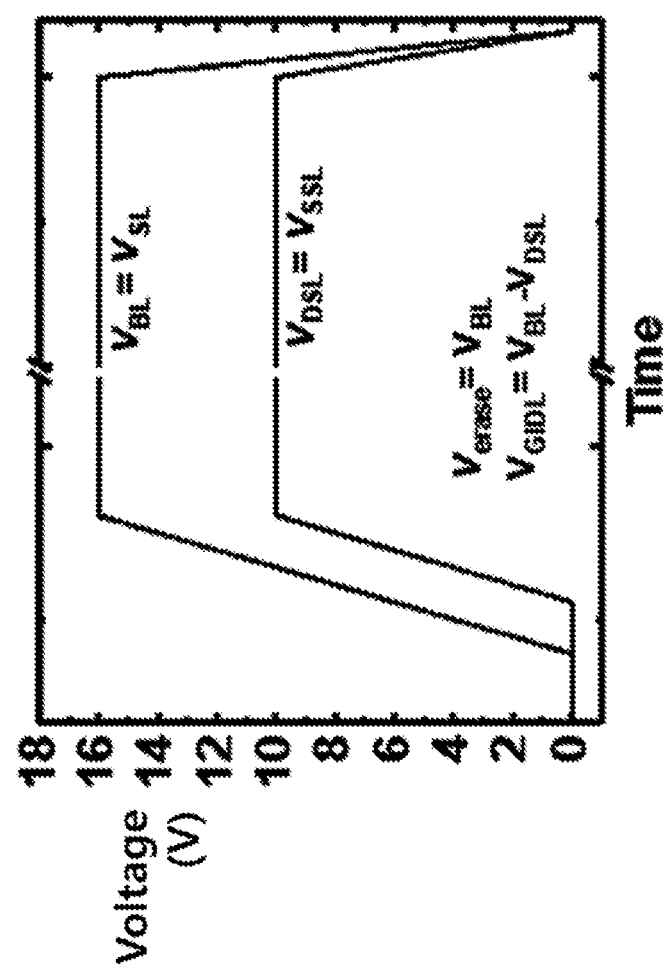
FIG. 5A is a graph showing an erase condition of a conventional flash memory device.
Figure 5B:
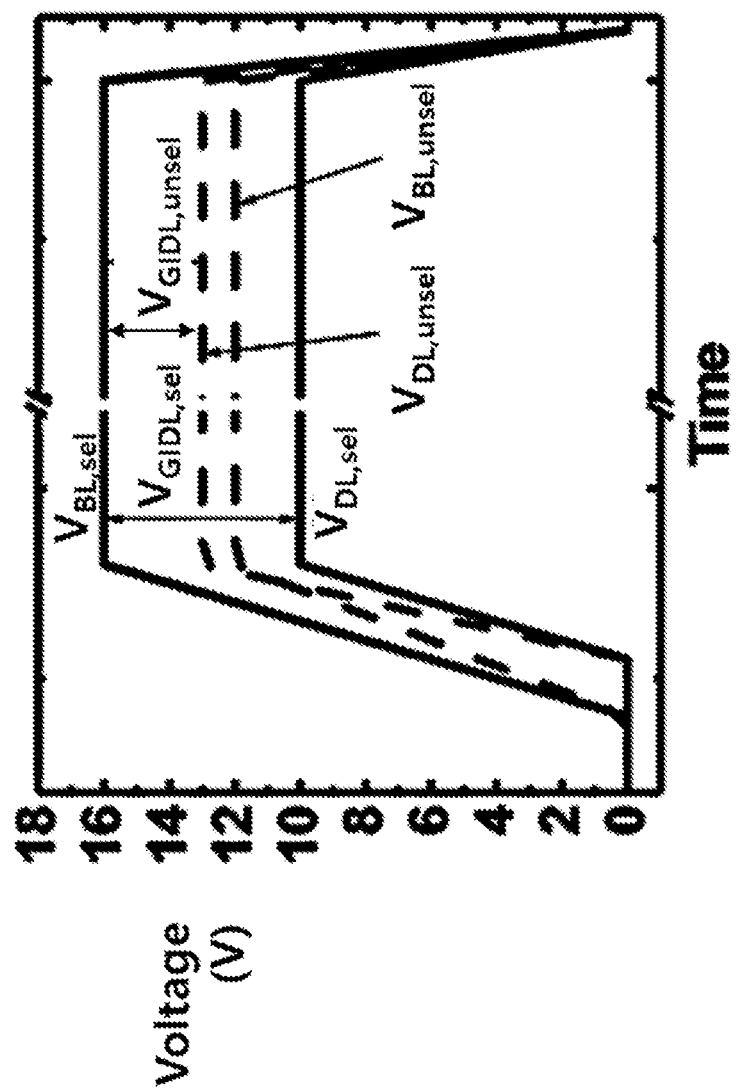
FIG. 5B is a graph showing an erase condition of a flash memory cell of a flash memory device according to an embodiment of the present disclosure.

FIGS. 5A and 5B comparatively show erase operations of a flash memory device.

FIG. 5A is a graph illustrating a block erase operation of a conventional flash memory device.

Conventionally, during the block erase operation, voltages $V_{BL}$ of all bit lines BL and a voltage $V_{SL}$ of a source line SL included in a block rise to, for example, 16V.

When the voltage $V_{BL}$ of the bit line BL and the voltage $V_{SL}$ of the source line SL start to increase, a drain selection line DSL and a source selection line SSL maintain a low voltage, for example, 0V.

When the voltage $V_{BL}$ of the bit line BL and the voltage $V_{SL}$ of the source line SL rise above a certain level, a voltage $V_{DSL}$ of the drain selection line DSL and a voltage $V_{SSL}$ of the source selection line SSL start to rise.

The voltage $V_{DSL}$ of the drain selection line DSL and the voltage $V_{SSL}$ of the source selection line SSL maintain, for example, 10V, while the voltage $V_{BL}$ of the bit line BL and the voltage $V_{SL}$ of the source line SL maintain 16V.

At this time, when a low voltage, for example, 0V, is applied to control gates of all flash memory cells FC included in the block, an electron-hole pair is generated due to GIDL, and thus an erase operation is performed on all flash memory cells FC in the block by the GIDL.

FIG. 5B is a graph explaining a cell erase operation for a selected flash memory cell in accordance with an embodiment.

Unlike FIG. 5A, voltage conditions for an unselected bit line and an unselected drain selection line are additionally set for the cell erase operation on the selected flash memory cell.

In this embodiment, a voltage $V_{BL,unsel}$ of an unselected bit line rises together with a voltage $V_{BL,sel}$ of a selected bit line, but rises to a lower voltage, for example, 12V, than the voltage $V_{BL,sel}$ of the selected bit line that rises to 16V.

Also, a voltage $V_{DL,unsel}$ of an unselected drain selection line rises along with a voltage $V_{DL,sel}$ of a selected drain selection line, but rises to a higher voltage, for example, 13V, than the voltage $V_{DL,sel}$ of the selected drain selection line that rises to 10V.

Accordingly, a GIDL voltage $V_{GIDL,sel}$ between the selected bit line and the selected drain selection line satisfies the condition for an erase operation by GIDL, and thus an erase operation is performed for the selected flash memory cell.

On the other hand, a GIDL voltage $V_{GIDL,unsel}$ between the unselected bit line and an arbitrary drain selection line or between an arbitrary bit line and the unselected drain selection line does not satisfy the condition for the erase operation by the GIDL, and thus an erase operation is suppressed for an unselected flash memory cell.

Figure 6:
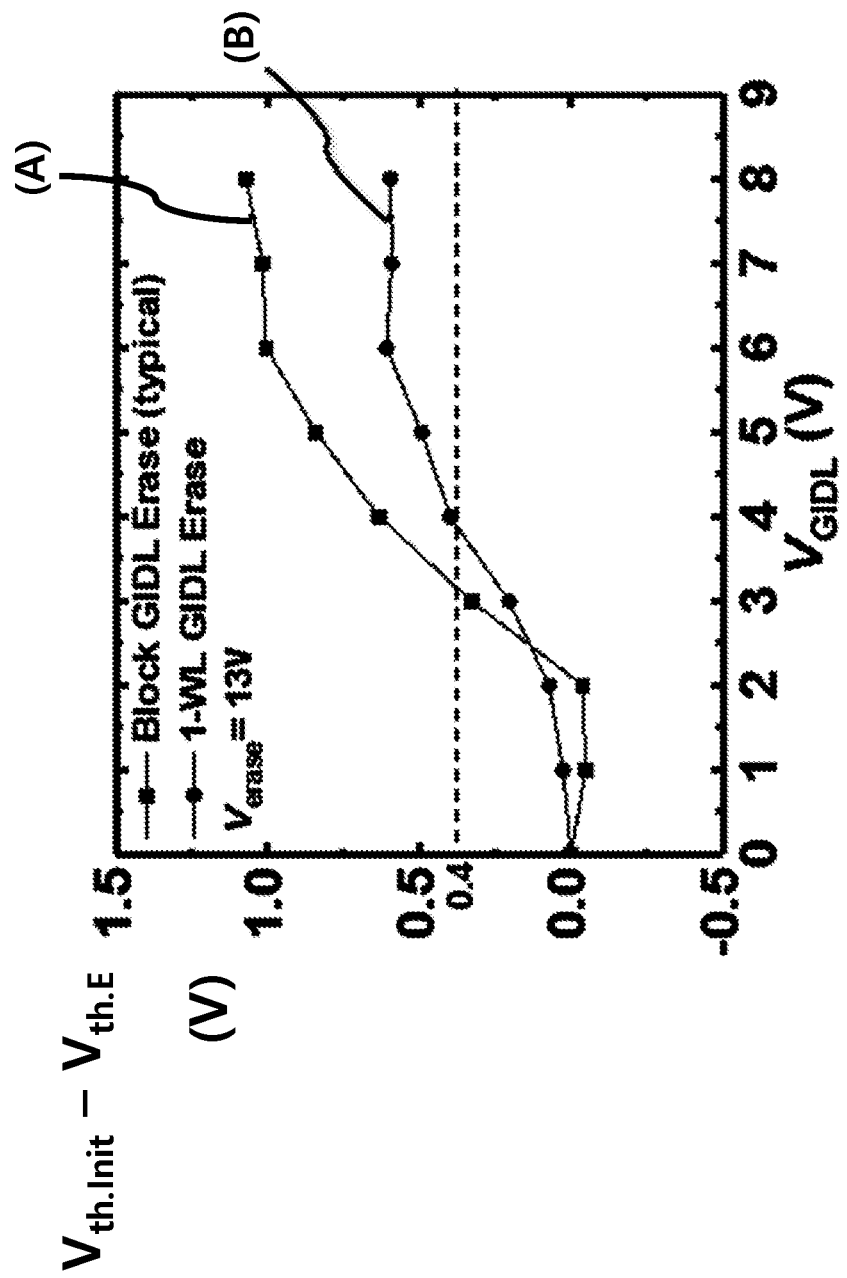
FIG. 6 is a graph showing a relationship between a GIDL voltage and change of a threshold voltage of a flash memory cell of a flash memory device according to an embodiment of the present disclosure.

FIG. 6 is a graph illustrating a relationship between a GIDL voltage and change of a threshold voltage of a flash memory cell.

In FIG. 6, (A) corresponds to a block erase operation, and (B) corresponds to a cell erase operation.

The vertical axis represents change of a threshold voltage of a flash memory cell before and after performing an erase operation. $V_{th,Init}$ represents the threshold voltage of the flash memory cell before performing the erase operation and $V_{th,E}$ represents the threshold voltage of the flash memory cell after performing the erase operation. Since the threshold voltage decreases during the erase operation, a threshold voltage change ($V_{th,Init} - V_{th,E}$) after performing the erase operation has a positive value.

An amount of the threshold voltage change ($V_{th,Init} - V_{th,E}$) by which it is determined that the erase operation is completed may vary according to embodiments, and may be determined in advance by an experiment or a simulation.

In this embodiment, it is assumed that the erase operation is completed when the threshold voltage change ($V_{th,Init} - V_{th,E}$) becomes 0.4V. Under these conditions, in the conventional case, the block erase operation is completed when the GIDL voltage $V_{GIDL}$ is greater than or equal to about 3.2V as indicated by (A), but in the present embodiment, the cell erase operation is completed when the GIDL voltage $V_{GIDL}$ is greater than or equal to 4V as indicated by (B).

Determining a voltage of a bit line and a voltage of a string selection line while satisfying the condition of FIG. 6 may be variously changed by a person skilled in the art.

In FIG. 6, it is assumed that an erase voltage $V_{erase}$ is 13V. However, when the erase voltage $V_{erase}$ is increased to 16V, the GIDL voltage $V_{GIDL}$ required for performing the erase operation may be changed.

Figure 7:
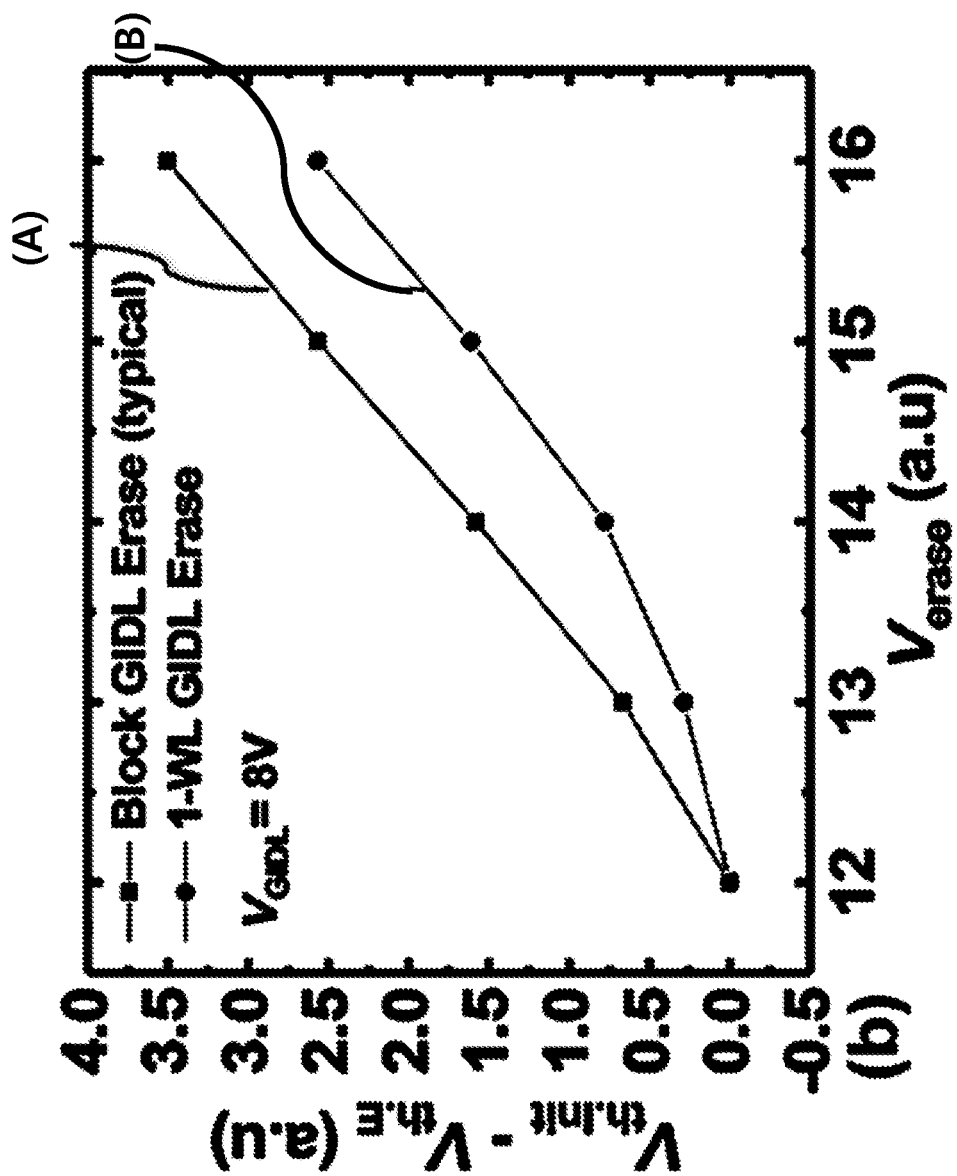
FIG. 7 is a graph showing a relationship between an erase voltage and change of a threshold voltage of a flash memory cell of a flash memory device according to an embodiment of the present disclosure.

FIG. 7 is a graph illustrating a relationship between an erase voltage and change of a threshold voltage of a flash memory cell.

In FIG. 7, (A) corresponds to a block erase operation, and (B) corresponds to a cell erase operation.

As shown in FIG. 7, when a GIDL voltage $V_{GIDL}$ is fixed, the threshold voltage change $(V_{th.Init}-V_{th.E})$ increases as an erase voltage $V_{erase}$ is increased.

Accordingly, when the erase voltage $V_{erase}$ is increased to 16V, the GIDL voltage $V_{GIDL}$ in FIG. 6 may be also changed.

Figure 8:
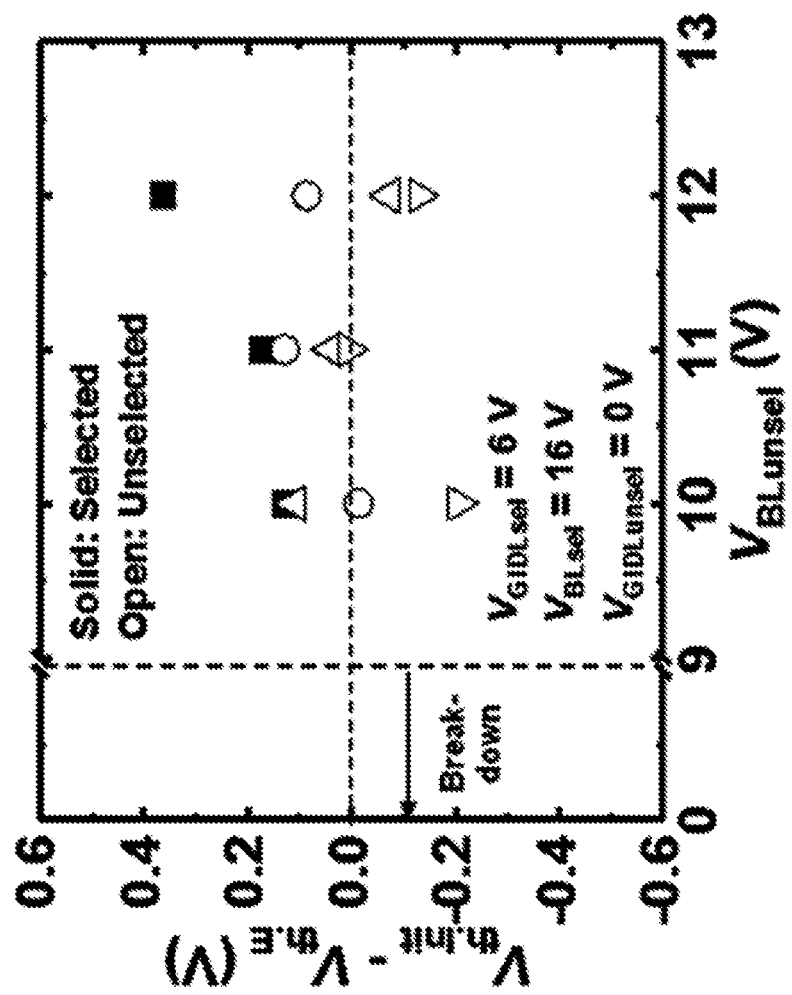
FIG. 8 is a graph showing a relationship between a voltage of an unselected bit line and change of a threshold voltage of a flash memory cell of a flash memory device according to an embodiment of the present disclosure.

FIG. 8 illustrates a relationship between a voltage of a bit line and change of a threshold voltage of a flash memory cell in an unselected NAND string.

In FIG. 8, a voltage $V_{BLsel}$ of a selected bit line is 16V, a GIDL voltage $V_{GIDLsel}$ of a selected NAND string is 6V, and a GIDL voltage $V_{GIDLunsel}$ of the unselected NAND string is 0V.

In FIG. 8, when a voltage $V_{BLunsel}$ of an unselected bit line is less than 9V, a voltage difference between the selected bit line and the unselected bit line is significant, which may cause a breakdown phenomenon.

Accordingly, the voltage $V_{BLunsel}$ of the unselected bit line must be 9V or higher.

FIG. 8 shows cases where the voltage $V_{BLunsel}$ of the unselected bit lines is 10V, 11V, and 12V.

In FIG. 8, a black rectangle shape represents a selected flash memory cell, and the other shapes represent unselected flash memory cells.

Even if the voltage $V_{BLunsel}$ of the unselected bit line increases, the threshold voltage change $(V_{th.Init}-V_{th.E})$ of an unselected flash memory cell is insignificant.

However, the threshold voltage $(V_{th.Init}-V_{th.E})$ of the selected flash memory cell gradually increases as the voltage $V_{BLunsel}$ of the unselected bit line increases.

For example, when the voltage $V_{BLunsel}$ of the unselected bit line is 12V, the threshold voltage change $(V_{th.Init}-V_{th.E})$ of the selected flash memory cell increases to 0.4V or higher.

If a higher voltage is applied to the unselected bit line, i.e., if the voltage $V_{BLunsel}$ of the unselected bit line increases, the threshold voltage change $(V_{th.Init}-V_{th.E})$ of the selected flash memory cell may increase. On the other hand, a threshold voltage of an unselected flash memory cell varies greatly as a GIDL voltage $V_{GIDLunsel}$ between an unselected bit line and an arbitrary string selection line increases.

A low voltage may be applied to an unselected bit line to prevent GIDL from occurring in the unselected bit line. However, as described above, when the low voltage is applied to the unselected bit line, the breakdown phenomenon may occur. Therefore, to prevent the breakdown phenomenon from occurring, a space between bit lines may be increased, but this is not preferable because it degrades cell integration.

Figure 9:
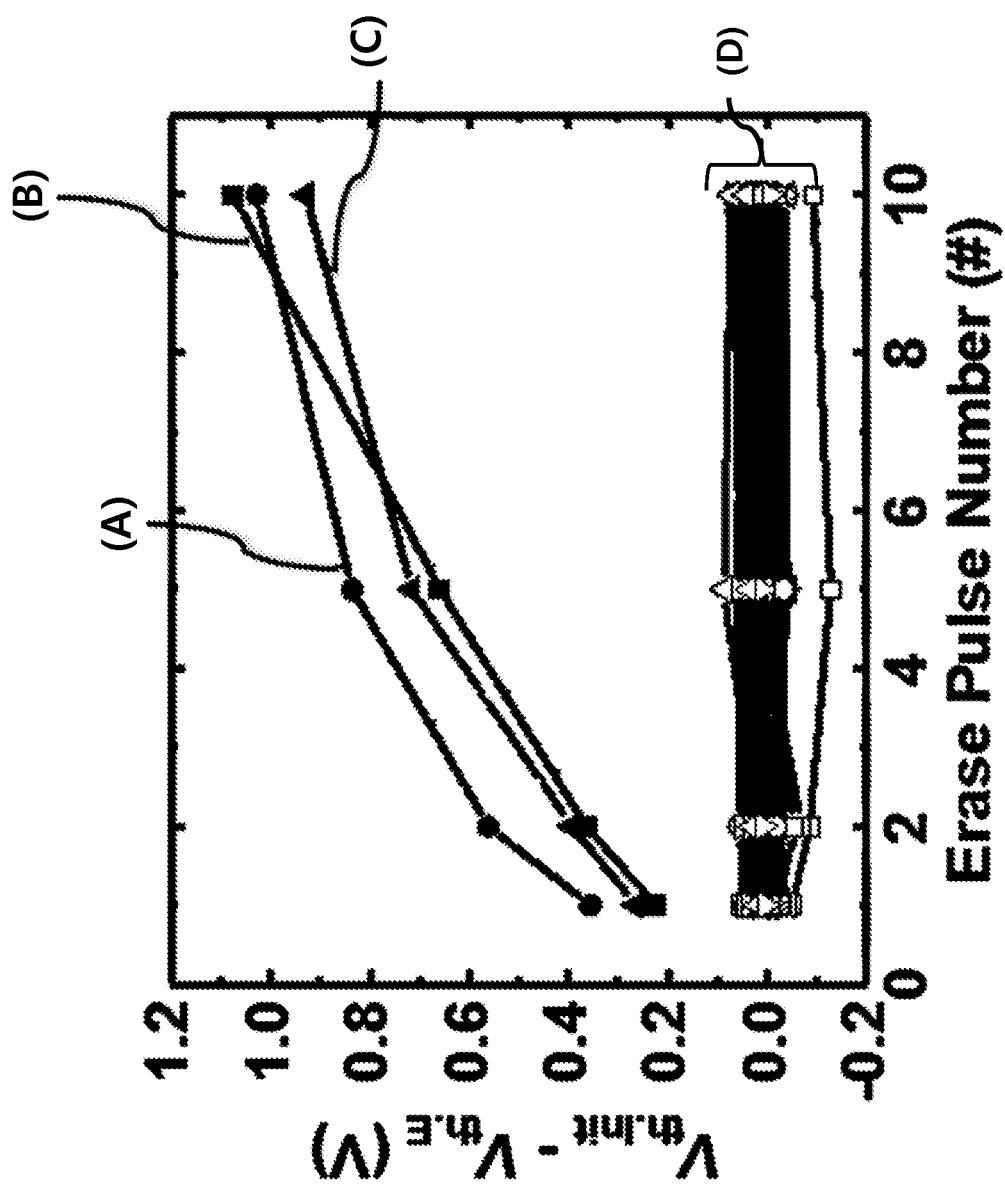
FIG. 9 is a graph showing a relationship between a location of a flash memory cell and change of a threshold voltage of a flash memory cell of a flash memory device according to an embodiment of the present disclosure.

FIG. 9 is a graph illustrating a relationship between a position of a selected flash memory cell in a NAND string having a three-dimensional structure and change of a threshold voltage of the selected flash memory cell.

In FIG. 9, (A) corresponds to a case in which the selected flash memory cell is located in the middle of the NAND string, e.g., the NAND string 200 in FIG. 1, (B) corresponds to a case in which the selected flash memory cell is located at the bottom of the NAND string 200, and (C) corresponds to a case in which the selected flash memory cell is located at the top of the NAND string 200, and (D) corresponds to an unselected flash memory cell.

As illustrated in (D) of FIG. 9, change of a threshold voltage $(V_{th.Init}-V_{th.E})$ of the unselected flash memory cell is insignificant regardless of the number of erase pulses that corresponds to the number of erase operations.

However, it can be seen that the threshold voltage change $(V_{th.Init}-V_{th.E})$ of the selected flash memory cell is similar to each other regardless of the location of the selected flash memory cell, and that the threshold voltage $(V_{th.Init}-V_{th.E})$ of the selected flash memory cell increases as the number of erase operations increases.

Through this, a threshold voltage of a specific flash memory cell can be adjusted to a desired level when an erase operation for the specific flash memory cell is repeated.

In the above, a three dimensional (3D) NAND flash memory device capable of performing a selective erase operation has been disclosed.

Hereinafter, a technique for improving data retention characteristics by performing a selective erase operation after a program operation is completed in such a 3D NAND flash memory device will be described.

Figure 10:
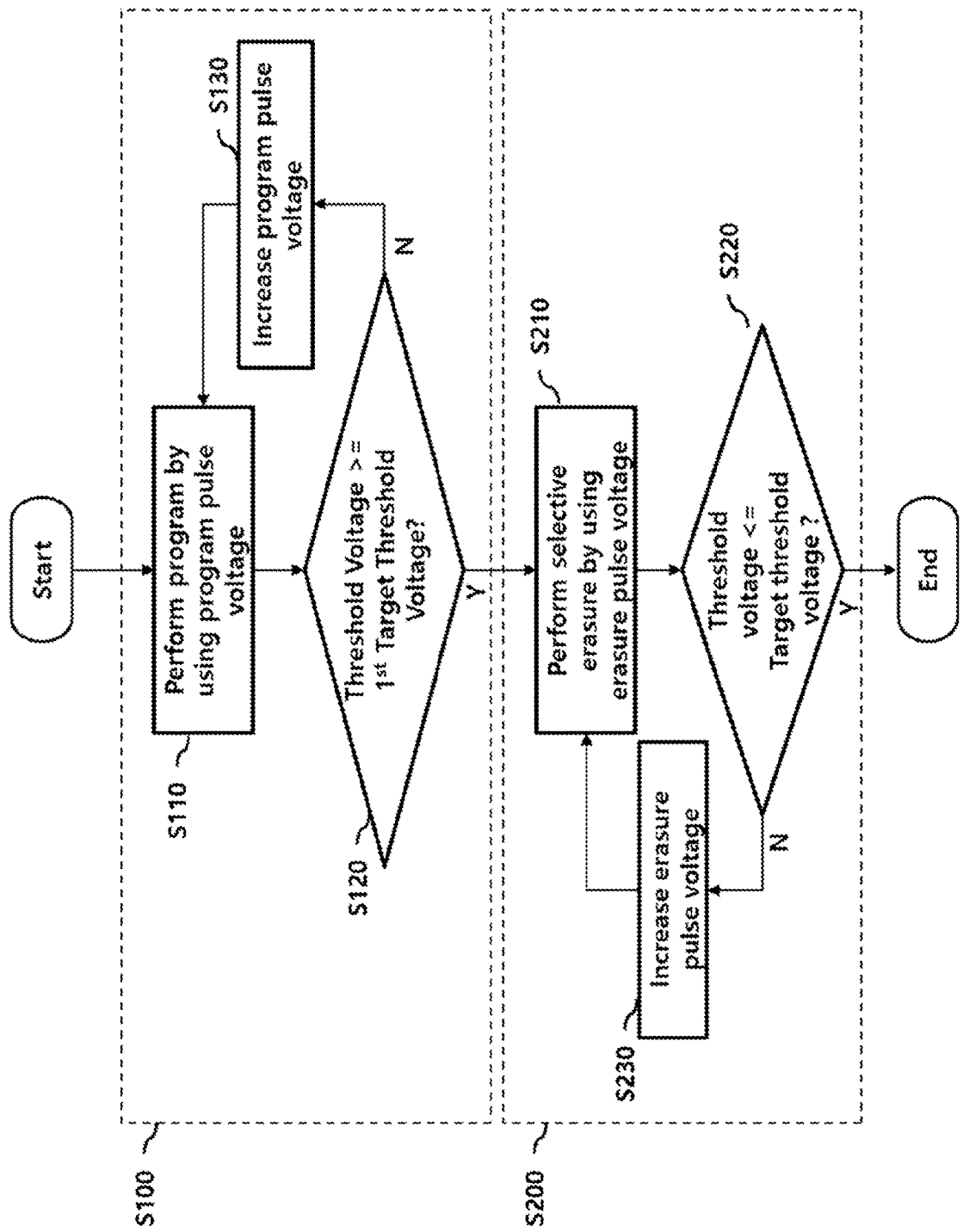
FIGS. 10 and 11 show an operation of a flash memory device according to an embodiment of the present disclosure.

FIG. 10 is a flowchart illustrating operations of a flash memory according to an embodiment of the present disclosure.

FIG. 10 illustrates performing a program operation S100 on one flash memory cell and then performing a selective erase operation S200 on the one flash memory cell.

Referring to one word line in the 3D flash memory device of FIG. 1, after the program operation S100 is completed for a plurality of flash memory cells connected to the one word line, the selective erase operation S200 may be performed on the plurality of flash memory cells connected to the one word line.

Referring to a plurality of word lines in the 3D flash memory device of FIG. 1, after a program operation and a selective erase operation are completed for one word line, a program operation and a selective erase operation may be performed for the next word line, so that the program and erase operations for all flash memory cells may be completed. Or the program and erase operations on all flash memory cells may be completed by sequentially performing selective erase operations on the plurality of word lines after sequentially performing program operations on the plurality of word lines.

Hereinafter, the program and erase operations are disclosed based on one selected flash memory cell.

First, a program operation, that is, a write operation, is performed on the selected flash memory cell using a program pulse voltage at S110.

An operation of programming the selected flash memory cell connected to a selected word line by applying a sequentially incrementing program pulse voltage to the selected word line is referred to as an incremental step pulse programming (ISPP). Since ISPP itself is well known, a description thereof will be omitted.

Thereafter, it is determined whether a threshold voltage of the selected flash memory cell is equal to or greater than a first target threshold voltage at S120.

In this case, the first target threshold voltage is greater than a desired target threshold voltage corresponding to data to be written to the selected flash memory cell.

The desired target threshold voltage and the first target threshold voltage determined according to data may be variously changed according to embodiments. Hereinafter, the desired target threshold voltage may be simply referred to as a "target threshold voltage."

When the threshold voltage of the selected flash memory cell is smaller than the first target threshold voltage, the program pulse voltage is increased at S130 and the step S110 is repeatedly performed.

When the threshold voltage of the selected flash memory cell is equal to or greater than the first target threshold voltage, the selective erase operation S200 is performed.

First, the selective erase operation is performed on the selected flash memory cell using an erase pulse voltage at S210.

The selective erase operation has been described in detail with reference to FIGS. 1 to 9.

In FIG. 10, it is assumed that the erase operation is performed using sequentially incrementing erase pulse voltages.

At this time, the erase pulse voltage is a voltage applied to a selected bit line, and corresponds to the erase voltage $V_{erase}$ shown in FIG. 7.

As shown in FIG. 7, it can be seen that the threshold voltage $V_{th,E}$ is further decreased when the erase voltage $V_{erase}$ of the selected bit line is increased during the erase operation.

An erase operation performed using a gradually incrementing erase pulse voltage is referred to as an incremental step pulse erasing (ISPE) operation.

Then, it is determined whether the threshold voltage of the selected flash memory cell is equal to or smaller than the target threshold voltage at S220.

When the threshold voltage of the selected flash memory cell is greater than the target threshold voltage, the erase pulse voltage is increased at S230, and then the step S210 is repeatedly performed.

When the threshold voltage of the selected flash memory cell is equal to or smaller than the target threshold voltage, the erase operation is completed.

Figure 11:
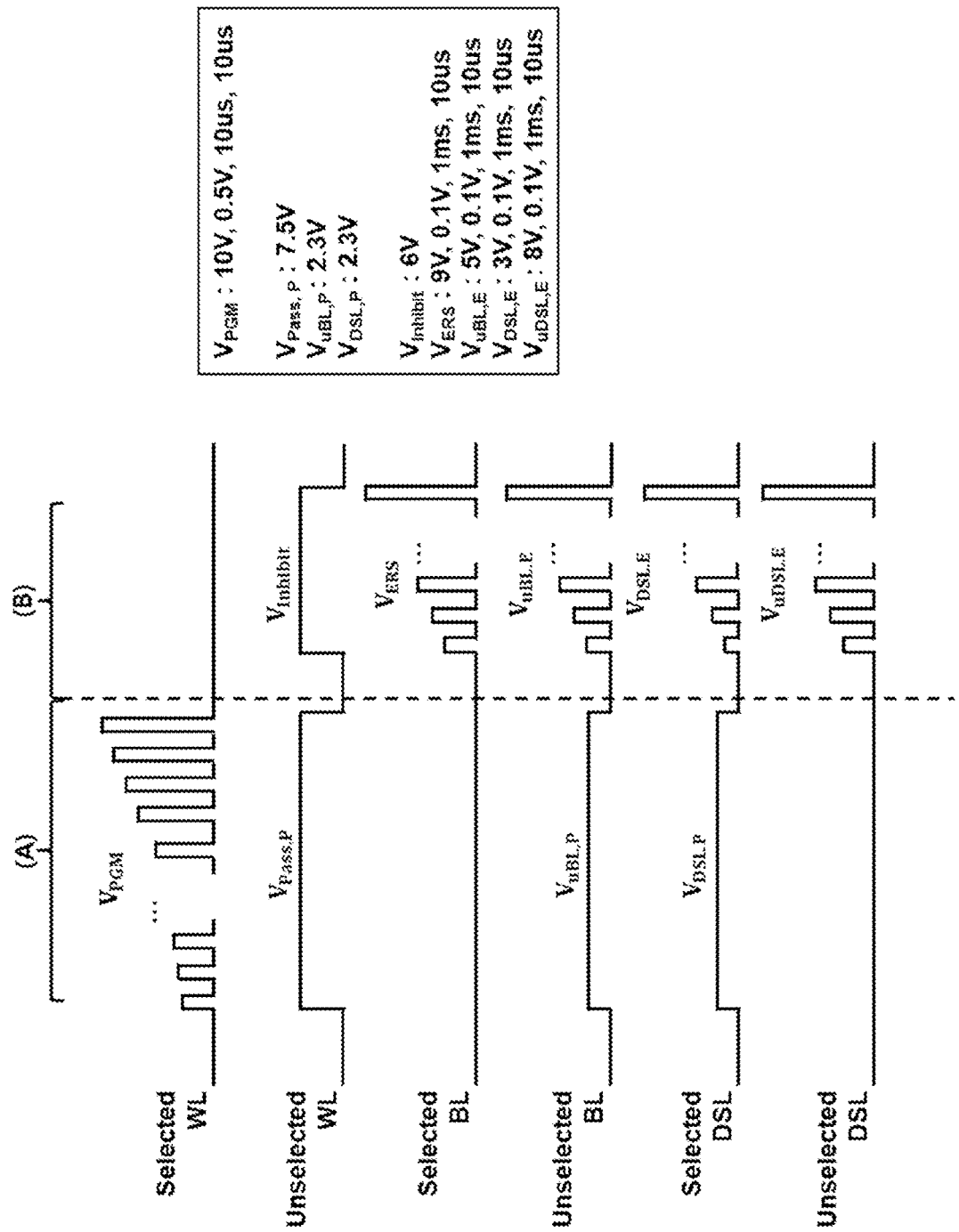

FIG. 11 is a diagram illustrating an operation of a flash memory device according to an embodiment of the present disclosure.

In FIG. 11, section (A) corresponds to the steps S110, S120, and S130 of performing the write operation of FIG. 10 until the threshold voltage becomes greater than the first target threshold voltage, and section (B) corresponds to the steps S210, S220, and S230 of performing the erase operation of FIG. 10 until the threshold voltage becomes equal to or smaller than the target threshold voltage.

In the section (A), the write operation is performed by applying an ISPP method. In the ISPP method, a method of providing voltages to word lines WL, source lines SL, bit lines BL, and drain selection lines DSL is the same as in the prior art.

During the write operation, a program pulse voltage $V_{PGM}$ is applied to a selected word line, a pass voltage $V_{PASS,P}$ is applied to an unselected word line, a ground voltage is applied to a selected bit line, and an unselected bit line voltage $V_{uBL,P}$ is applied to an unselected bit line, a drain selection voltage $V_{DSL,P}$ is applied to a selected drain selection line, and a ground voltage is applied to an unselected drain selection line.

The magnitude of each voltage is indicated on the right side of FIG. 11. The program pulse voltage $V_{PGM}$ is a pulse voltage that gradually increments. An initial value of the program pulse voltage $V_{PGM}$ is 10V, and a step voltage, which is a voltage difference between two consecutive pulses of the program pulse voltage $V_{PGM}$, is 0.5V. In addition, a pulse width of the program pulse voltage $V_{PGM}$ is 10us, and an interval between the two consecutive pulses is 10us.

As described above, the write operation for each flash memory cell is performed until the threshold voltage is greater than the first target threshold voltage that is greater than the target threshold voltage corresponding to data to be written.

That is, in the process of performing a write operation on a plurality of flash memory cells commonly connected to a selected word line, data to be written to each of the plurality of flash memory cells may be different, and accordingly, a corresponding target threshold voltage and a first target threshold voltage for each of the plurality of flash memory cells may also be different from those for the other flash memory cells.

Accordingly, the write operation may be terminated faster for some of the plurality of flash memory cells than for the other flash memory cells. In this case, bit lines connected to some of the plurality of flash memory cells on which the write operation is completed are treated as unselected bit lines while the write operation is still performed for the other flash memory cells.

The principle of the selective erase operation is the same as described above.

That is, the ground voltage is applied to a selected word line and an inhibit voltage $V_{inhibit}$ is applied to an unselected word line.

As described above, an erase pulse voltage is applied to a selected bit line, which is indicated as $V_{ERS}$ in FIG. 11.

In addition, each of a voltage $V_{uBL,E}$ applied to an unselected bit line, a voltage $V_{DSL,E}$ applied to a selected drain selection line, and a voltage $V_{uDSL,E}$ applied to an unselected drain selection line has a form of a pulse voltage that sequentially increments.

These are to satisfy the above-described condition for performing the erase operation according to the GIDL scheme only for one selected flash memory cell among a plurality of flash memory cells in the same string according to change of the erase pulse voltage $V_{ERS}$.

Various design changes can be made by a person skilled in the art to sequentially change the pulse of each of the above-described voltages so that it is possible to perform the selective erase operation for a selected flash memory cell by a GIDL current.

FIG. 11 describes a pulse shape of each of the above-described voltages.

The erase pulse voltage $V_{ERS}$ is a pulse voltage that sequentially increments, where an initial pulse of the erase pulse voltage $V_{ERS}$ has 9V, and a step voltage, which is a voltage difference between two consecutive pulses of the erase pulse voltage $V_{ERS}$, is 0.1V. In addition, the pulse width of the erase pulse voltage $V_{ERS}$ is 1 ms, and an interval between the two consecutive pulses is 10 us. For each of the other pulse voltages, a pulse shape is similar to the pulse shape of the erase pulse voltage $V_{ERS}$ except an initial value of the pulse voltage.

In this embodiment, the pulse width of the erase pulse voltage $V_{ERS}$, e.g., 1 ms, is greater than the pulse width of the program pulse voltage $V_{PGM}$, e.g., 10us, and the magnitude of the step voltage of the erase pulse voltage $V_{ERS}$, e.g., 0.1V, is smaller than the step voltage of the program pulse voltage $V_{PGM}$, e.g., 0.5V.

Figure 12:
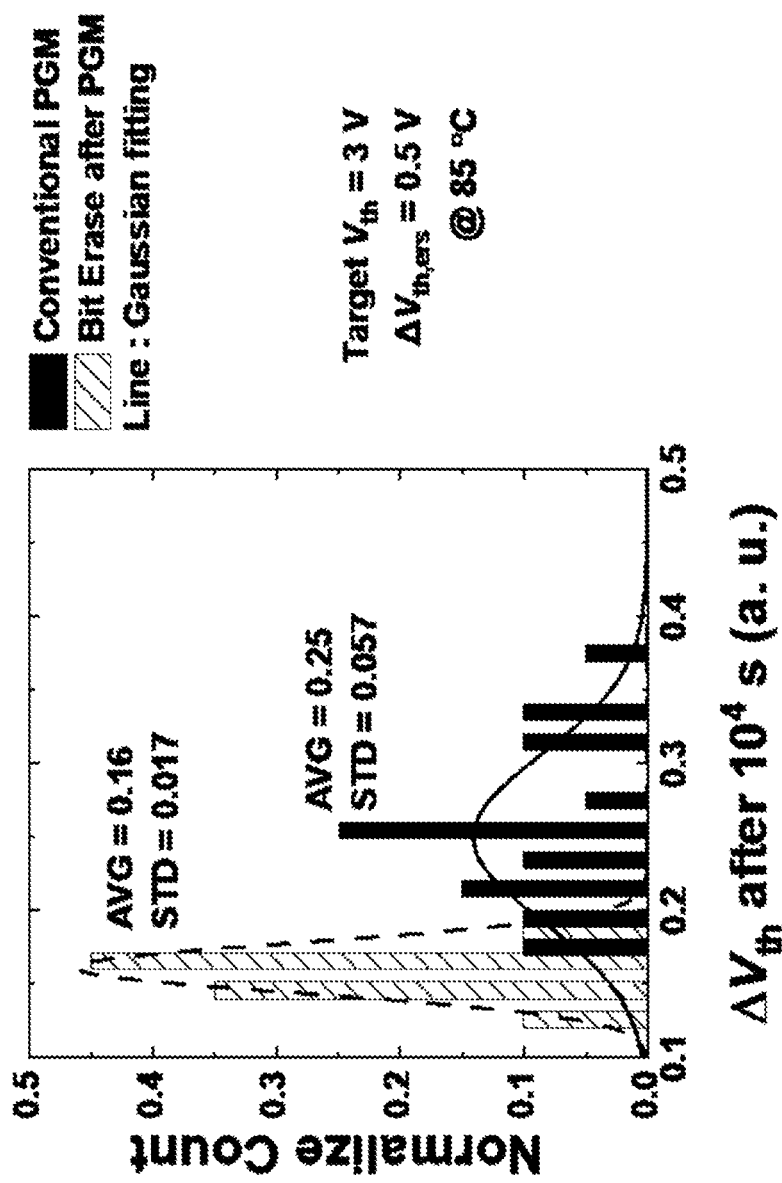
FIG. 12 is a graph showing an effect of an embodiment of the present disclosure.

FIG. 12 is a graph illustrating effects of the present embodiment.

In the graph, the horizontal axis represents an amount of change in a threshold voltage when 10,000 seconds have elapsed after the completion of the write operation, and the vertical axis represents the normalized number of cells.

In FIG. 12, the target threshold voltage is 3V and the first target threshold voltage is 3.5V at 85 degrees Celsius.

The prior art corresponds to the case where a write operation is performed by the ISPP method as shown in the section (A) of FIG. 11, and the present embodiment corresponds to the case where a program operation is performed by the ISPP method and then an erase operation is performed by the ISPE method as shown in the section (B) of FIG. 11.

As shown in the graph, an average of the variation of the threshold voltage is smaller by 36% and the standard deviation is smaller by 70% in this embodiment than those in the prior art.

This indicates that data retention characteristics in this embodiment are further improved compared to the prior art.

Figure 13:
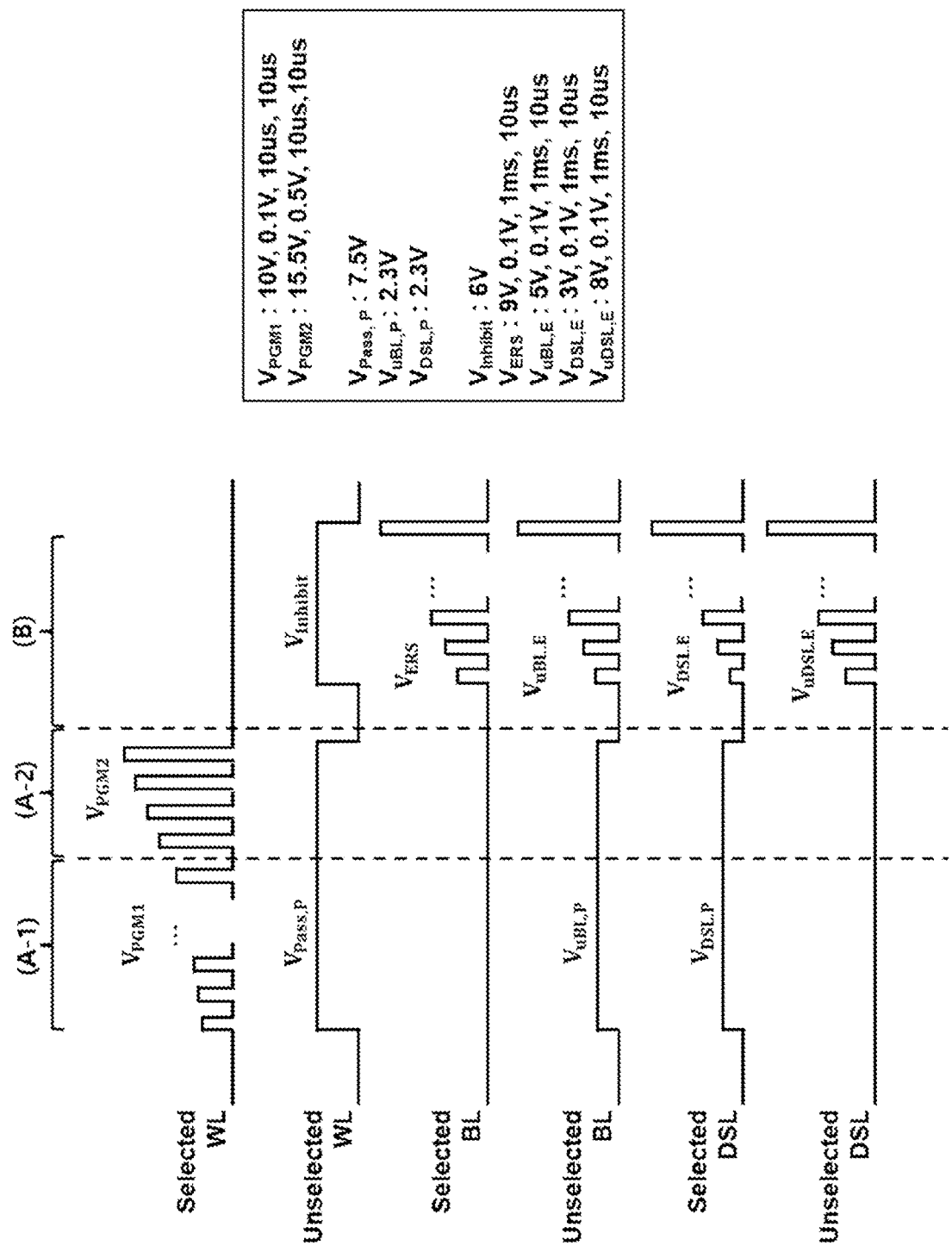
FIG. 13 shows an operation of a flash memory device according to another embodiment of the present disclosure.

FIG. 13 illustrates a write operation according to another embodiment of the present disclosure.

As the number of bits of data stored in a flash memory cell increases, the number of target threshold voltages respectively corresponding to the bits of data increases.

In this case, when a target threshold voltage exceeds a certain level, a program operation speed may decrease as a time for providing a program pulse voltage to the flash memory cell increases.

Unlike the previous embodiments, the embodiment illustrated in FIG. 13 improves the program operation speed by adjusting the size of a step voltage for changing the program pulse voltage according to a range of the target threshold voltage.

Referring to FIG. 13, it can be seen that the section (A) of FIG. 11, that is, the program operation section, is divided into a first section (A-1) and a second section (A-2).

The first section (A-1) corresponds to a case where the target threshold voltage is smaller than a reference voltage, and the second section (A-2) corresponds to a case where the target threshold voltage is equal to or greater than the reference voltage.

The first section (A-1) may be referred to as a first program operation section or a first write operation section, and the second section (A-2) may be referred to as a second program operation section or a second write operation section.

A program pulse voltage used in the first program operation section is indicated as a first program pulse voltage $V_{PGM1}$, and a program pulse voltage used in the second program operation period is indicated as a second program pulse voltage $V_{PGM2}$.

In this case, when a step voltage corresponding to the first program pulse voltage $V_{PGM1}$ is referred to as a first step voltage and a step voltage corresponding to the second program pulse voltage $V_{PGM2}$ is referred to as a second step voltage, the second step voltage is greater than the first step voltage.

In FIG. 13, the reference voltage is 2V, the first step voltage is 0.1V, and the second step voltage is 0.5V.

When the program operation has been completed for flash memory cells whose target threshold voltage is smaller than the reference voltage, the program operation speed may be improved by increasing the step voltage for flash memory cells having target threshold voltages exceeding the reference voltage.

In a flash memory cell, the smaller a target threshold voltage, the smaller a range of variation of a threshold voltage, and accordingly, the better data retention characteristics.

Accordingly, in this embodiment, the program operation is terminated without performing the selective erase operation, on the flash memory cells whose target threshold voltage is smaller than the reference voltage.

Accordingly, the program operation of the first section (A-1) is terminated when the threshold voltage is equal to or greater than the target threshold voltage, similar to the conventional program operation.

In contrast, the program operation of the second section (A-2) is terminated when the threshold voltage is equal to or greater than the first target threshold voltage, as in the above-described embodiment, and then the selective erase operation of the second section (B) is additionally performed.

Since the selective erase operation in the second section (B) is the same as that disclosed in FIG. 11 and other voltage conditions except the program pulse voltage are the same as those disclosed in FIG. 11, description thereof is omitted.

Figure 14:
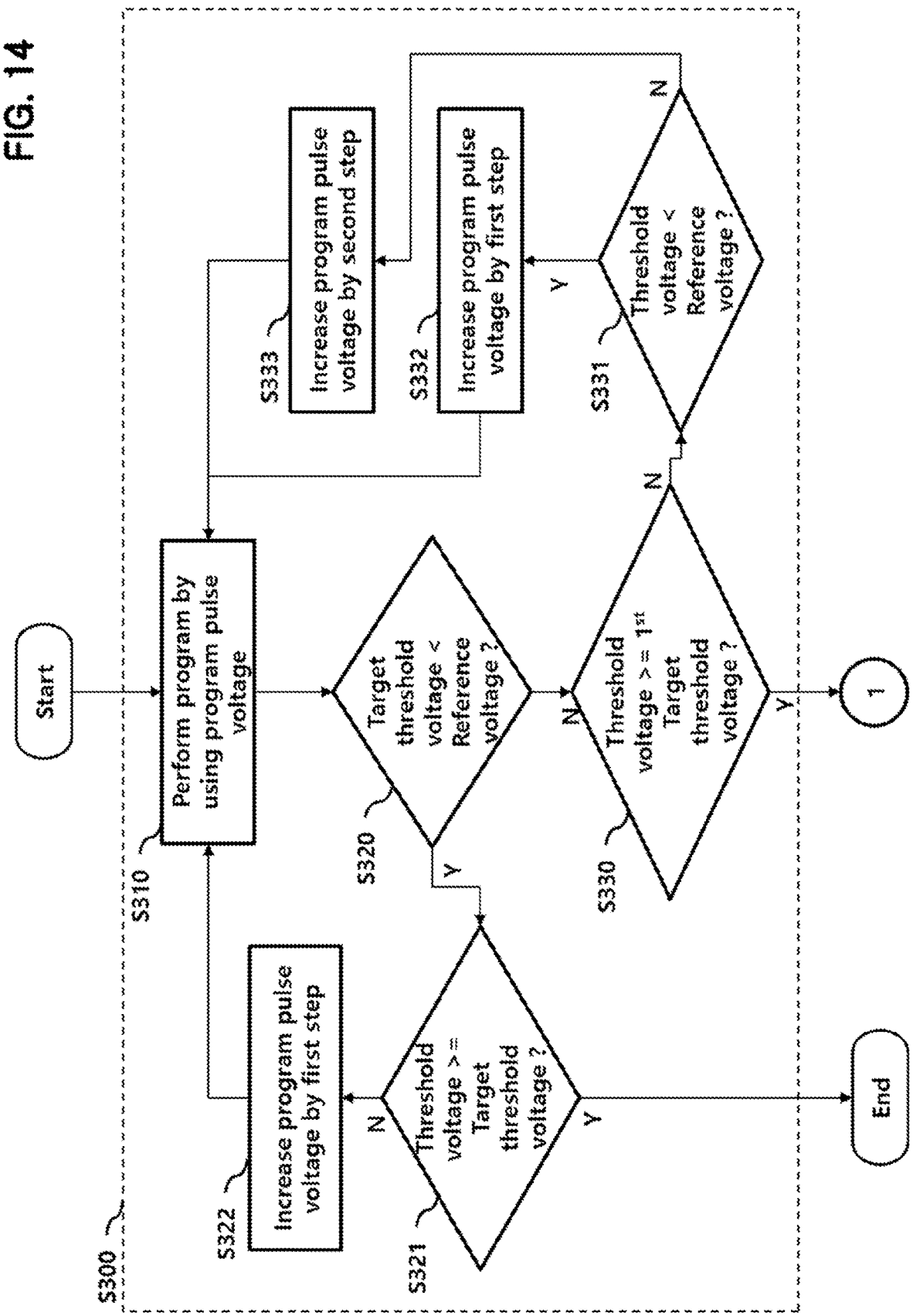
FIGS. 14 and 15 are flowcharts showing an operation of a flash memory device according to another embodiment of the present disclosure.
Figure 15:
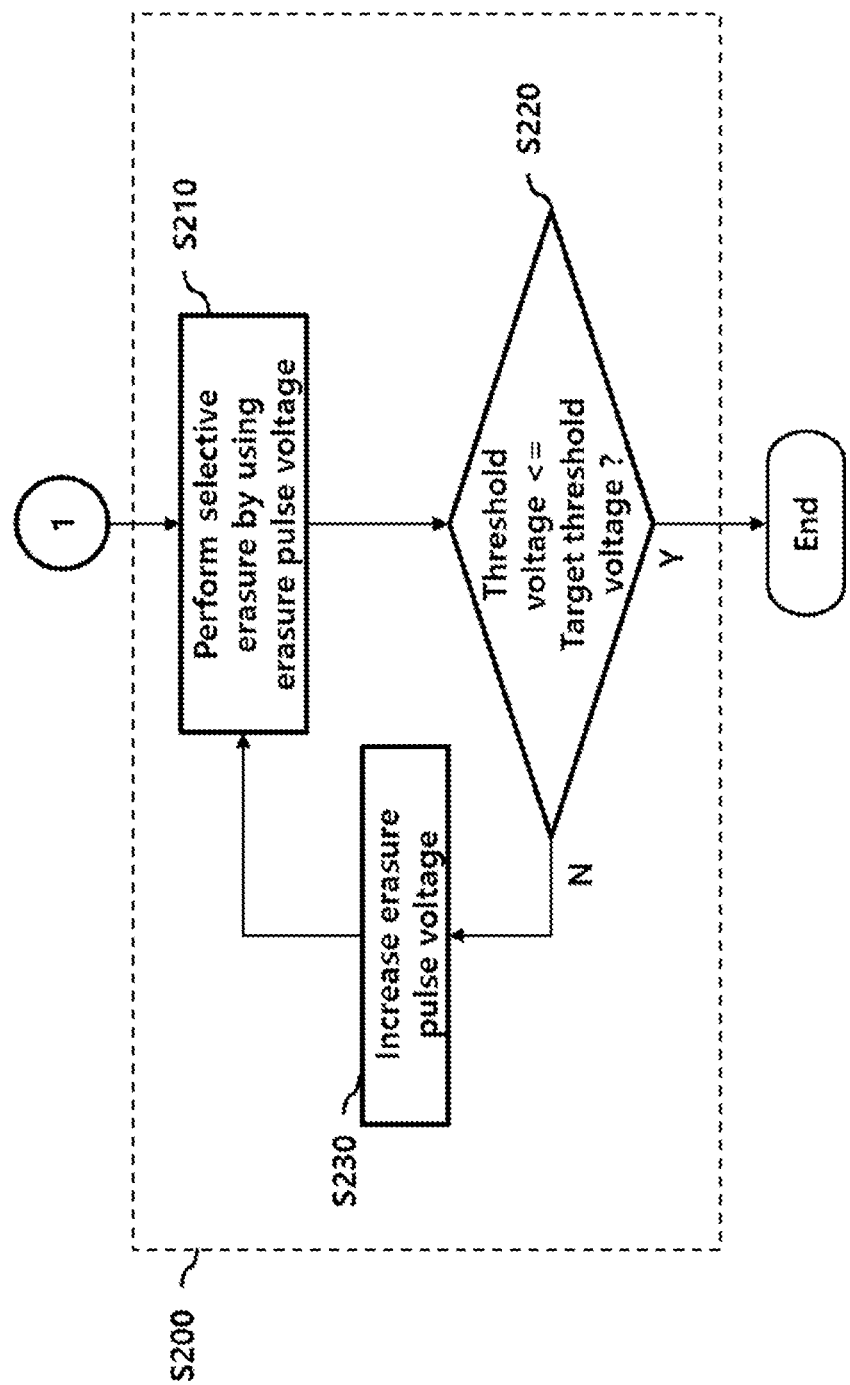

FIGS. 14 and 15 are flowcharts illustrating program and erase operations according to another embodiment of the present disclosure.

FIG. 14 shows a program operation S300 for a selected flash memory cell, and FIG. 15 shows a selective erase operation S200 for the selected flash memory cell.

The program operation S300 of FIG. 14 is another embodiment of the program operation S100 of FIG. 10, and the selective erase operation S200 of FIG. 15 is the same as the selective erase operation S200 of FIG. 10.

First, the program operation S300 of FIG. 14 is disclosed.

In the beginning, the program operation is performed using a program pulse voltage at S310.

Next, it is determined whether the target threshold voltage is smaller than the reference voltage at S320.

When the target threshold voltage is smaller than the reference voltage, it is determined whether the threshold voltage of the selected flash memory cell is equal to or greater than the target threshold voltage at S321.

When the threshold voltage is equal to or greater than the target threshold voltage, the program operation is terminated. Otherwise, the program pulse voltage is increased by a first step voltage at S322, and the process returns to step S310 and the above-described operation is repeated.

When the target threshold voltage is determined to be equal to or greater than the reference voltage at step S320, it is determined whether the threshold voltage is equal to or greater than the first target threshold voltage at S330.

When the threshold voltage is smaller than the first target threshold voltage, it is determined whether the threshold voltage is smaller than the reference voltage at S331.

When the threshold voltage is smaller than the reference voltage, the program pulse voltage is increased by the first step voltage at S332, and when the threshold voltage is not smaller than the reference voltage, the program pulse voltage is increased by a second step voltage at S333. Thereafter, the process returns to step S310 and the above-described operation is repeated. The first step voltage and the second step voltage are the same as those described with reference to FIG. 13.

When the threshold voltage is equal to or greater than the first target threshold voltage, the selective erase operation S200 of FIG. 15 is performed. Since the selective erasing operation S200 of FIG. 15 is the same as that described with reference to FIG. 10, description thereof will be omitted.

As described above, referring to one word line in the 3D flash memory device of FIG. 1, after the program operation S300 is completed for a plurality of flash memory cells connected to the one word line, the selective erase operation S200 may be performed on the plurality of flash memory cells connected to the one word line.

As described above, referring to a plurality of word lines in the 3D flash memory device of FIG. 1, the write operation on all flash memory cells may be completed by performing a program operation, and a selective erase operation for the next word line may be performed after a program operation and a selective erase operation for one word line are completed. Or the write operation on all flash memory cells may be completed by sequentially performing a selective erase operation for a plurality of word lines after sequentially completing program operations for the plurality of word lines.

Although various embodiments have been illustrated and described, various changes and modifications may be made to the described embodiments without departing from the spirit and scope of the invention as defined by the following claims.

What is claimed is:

1. A flash memory device comprising:
a cell array including a first memory string that includes a plurality of first flash memory cells and a first bit line selection switch, the plurality of first flash memory cells having control gates connected to a plurality of word lines, respectively, the first bit line selection switch connecting the plurality of first flash memory cells to a first bit line in response to a voltage of a first drain selection line; and
a control circuit configured to control a write operation for writing data into a selected flash memory cell among the plurality of first flash memory cells in the first memory string,
wherein the control circuit controls a first operation to program the selected flash memory cell with the data so that a threshold voltage of the selected flash memory cell becomes greater than a first target threshold voltage and a second operation to erase the selected flash memory cell so that the threshold voltage becomes equal to or smaller than a target threshold voltage, the first target threshold voltage being greater than the target threshold voltage that is set according to the data, and
wherein during the second operation, the control circuit controls a voltage difference between the first bit line and the first drain selection line to be a first voltage for generating a gate induced drain leakage (GIDL) current at the first bit line selection switch, and controls a voltage of a control gate of the selected flash memory cell and a voltage of a control gate of a first flash memory cell other than the selected flash memory cell to be different from each other.

2. The flash memory device of claim 1, wherein the cell array further comprises a second memory string that includes a plurality of second flash memory cells and a second bit line selection switch, the plurality of second flash memory cells having control gates connected to the plurality of word lines, respectively, the second bit line selection switch connecting the plurality of second flash memory cells to the first bit line in response to a voltage of a second drain selection line,
wherein during the second operation, the control circuit controls a voltage difference between the second drain selection line and the first bit line to be a second voltage that is smaller than the first voltage.

3. The flash memory device of claim 2, wherein the cell array further comprises a third memory string that includes a plurality of third flash memory cells and a third bit line selection switch, the plurality of third flash memory cells having control gates connected to the plurality of word lines, respectively, the third bit line selection switch connecting the plurality of third flash memory cells to a second bit line in response to the voltage of the first drain selection line,
wherein during the second operation, the control circuit controls a voltage difference between the first drain selection line and the second bit line to be a third voltage that is smaller than the first voltage.

4. The flash memory device of claim 3, wherein the cell array further comprises a fourth memory string that includes a plurality of fourth flash memory cells and a fourth bit line selection switch, the plurality of fourth flash memory cells having control gates connected to the plurality of word lines, respectively, the fourth bit line selection switch connecting the plurality of fourth flash memory cells to the second bit line in response to the voltage of the second drain selection line, and
wherein during the second operation, the control circuit controls a voltage difference between the second drain selection line and the second bit line to be a fourth voltage that is smaller than the first voltage.

5. The flash memory device of claim 3, wherein the control circuit controls a voltage of the second bit line to be smaller than a voltage of the first bit line during the second operation.

6. The flash memory device of claim 3, wherein the control circuit controls a voltage of the second bit line to be smaller than a voltage of the first bit line and to be greater than a voltage of the first drain selection line during the second operation.

7. The flash memory device of claim 2, wherein the control circuit controls a voltage of the second drain selection line to be smaller than a voltage of the first bit line and to be greater than a voltage of the first drain selection line during the second operation.

8. The flash memory device of claim 1, wherein the first memory string further includes a first source line selection switch configured to connect the plurality of first flash memory cells to a source line in response to a voltage of a source selection line, and
wherein the control circuit controls a voltage difference between the first source selection line and the source line to be smaller than the first voltage during the second operation.

9. The flash memory device of claim 1, wherein during the second operation, the control circuit controls the voltage of the control gate of the selected flash memory cell to be smaller than the voltage of the control gate of the first flash memory cell other than the selected flash memory cell.

10. The flash memory device of claim 1, wherein the cell array further includes a plurality of switches connecting the plurality of word lines and the control gates of the plurality of first flash memory cells, respectively, and
wherein during the second operation, the control circuit controls the plurality of switches so that the control gate of the selected flash memory cell is connected to a corresponding word line and the control gate of the first flash memory cell other than the selected flash memory cell is disconnected from a corresponding word line.

11. The flash memory device of claim 1, wherein during the first operation, the control circuit provides one or more sequentially incrementing voltage pulses to a word line connected to the selected flash memory cell.

12. The flash memory device of claim 11, wherein during the second operation, the control circuit provides one or more sequentially incrementing voltage pulses to each of the first bit line and the first drain selection line.

13. The flash memory device of claim 1, wherein when the target threshold voltage set according to the data to be programmed in the selected flash memory cell is smaller than a reference voltage, the control circuit controls a third operation to program the selected flash memory cell with the data so that the threshold voltage of the selected flash memory cell becomes equal to or greater than the target threshold voltage instead of performing the first operation and the second operation on the selected flash memory cell.

14. The flash memory device of claim 13, wherein during the first operation and the third operation, the control circuit provides one or more voltage pulses to a word line connected to the selected flash memory cell, controls the one or more voltage pulses to be incremented by a first step volage when the threshold voltage of the selected flash memory cell is smaller than the reference voltage, controls the one or more voltage pulses to be incremented by a second step voltage when the threshold voltage of the selected flash memory cell is equal to or greater than the reference voltage, wherein the first step voltage is smaller than the second step voltage.

15. An operation method of a flash memory device including a cell array including a first memory string having a plurality of first flash memory cells and a first bit line selection switch, the plurality of first flash memory cells having control gates connected to a plurality of word lines, respectively, the first bit line selection switch connecting the plurality of first flash memory cells to a first bit line in response to a voltage of a first drain selection line, the operation method comprising:
performing a first operation for programming a selected flash memory cell among the plurality of first flash memory cells so that a threshold voltage of the selected flash memory cell becomes equal to or greater than a first threshold voltage that is greater than a target threshold voltage set according to data to be programmed in the selected flash memory cell; and
performing a second operation for erasing the selected flash memory cell so that the threshold voltage of the selected flash memory cell becomes equal to or smaller than the target threshold voltage,
wherein performing the second operation includes:
controlling a voltage difference between the first bit line and the first drain selection line to be a first voltage for generating a gate induced drain leakage (GIDL) current at the first bit line selection switch, and
controlling a voltage of a control gate of the selected flash memory cell and a voltage of a control gate of a first flash memory cell other than the selected flash memory cell to be different from each other.

16. The operation method of claim 15, wherein performing the first operation includes providing one or more sequentially incrementing voltage pulses to a word line connected to the selected flash memory cell.

17. The operation method of claim 16, wherein performing the second operation includes providing one or more sequentially incrementing voltage pulses to the first bit line and the first drain selection line.

18. The operation method of claim 15, wherein when the target threshold voltage set according to data to be programmed in the selected flash memory cell is smaller than a reference voltage, the operation method includes performing a third operation for programing the selected flash memory cell so that the threshold voltage of the selected flash memory cell becomes equal to or greater than the target threshold voltage, instead of performing the first operation and the second operation for the selected flash memory cell.

19. The operation method of claim 18, wherein each of performing the first operation and performing the third operation step includes providing one or more voltage pulses to a word line connected to the selected flash memory cell, and
wherein the one or more voltage pulses are incremented by a first step volage when the threshold voltage of the selected flash memory cell is smaller than the reference voltage, and the one or more voltage pulses be incremented by a second step voltage when the threshold voltage of the selected flash memory cell is greater than the reference voltage, wherein the first step voltage is smaller than the second step voltage.

* * * * *